J. A. TAUTPHAEUS.
ANTISLIPPING DEVICE FOR POWER DRIVEN VEHICLE WHEELS.
APPLICATION FILED JUNE 19, 1913.
1,149,305.
Patented Aug. 10, 1915.
2 SHEETS—SHEET 2.
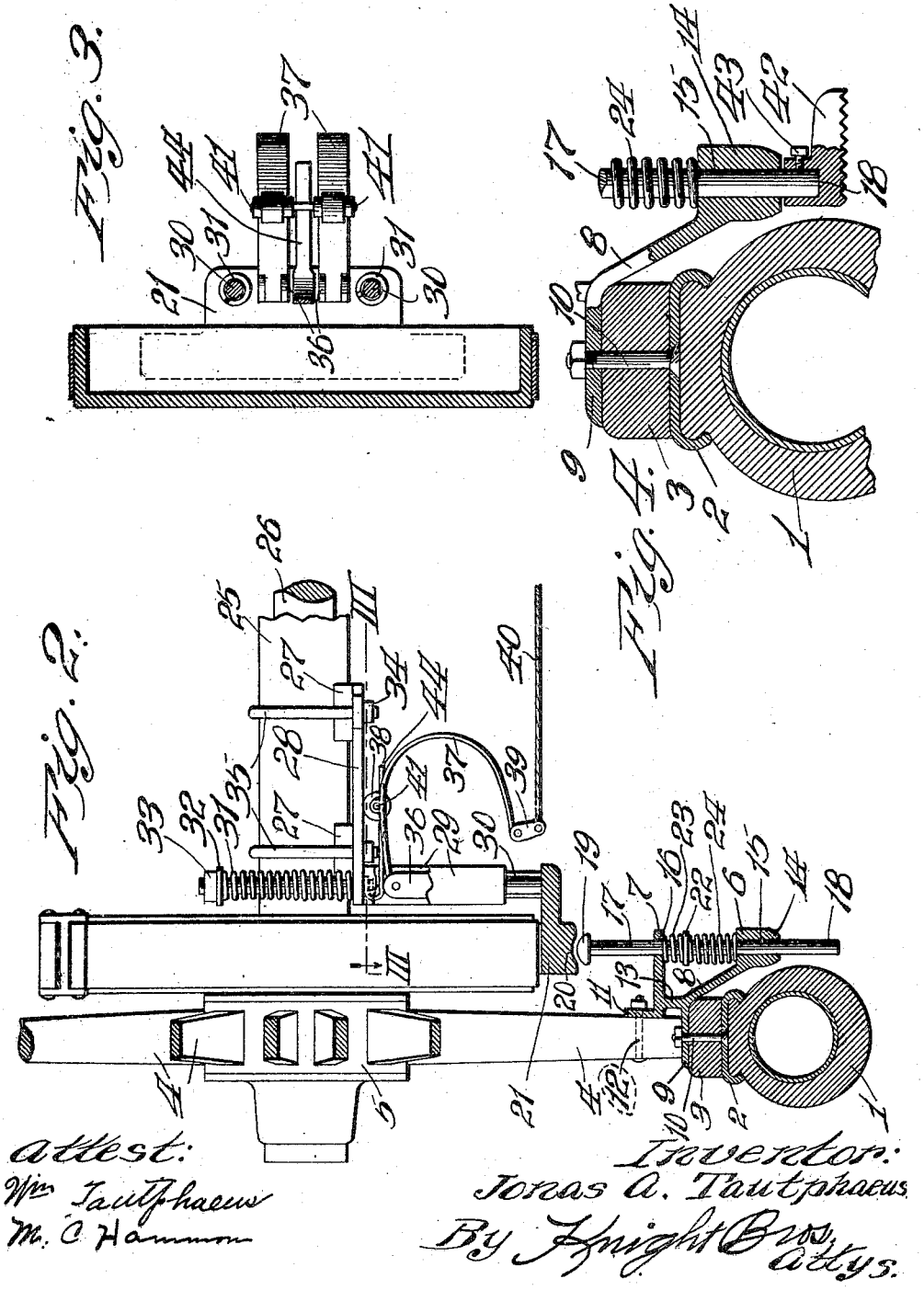

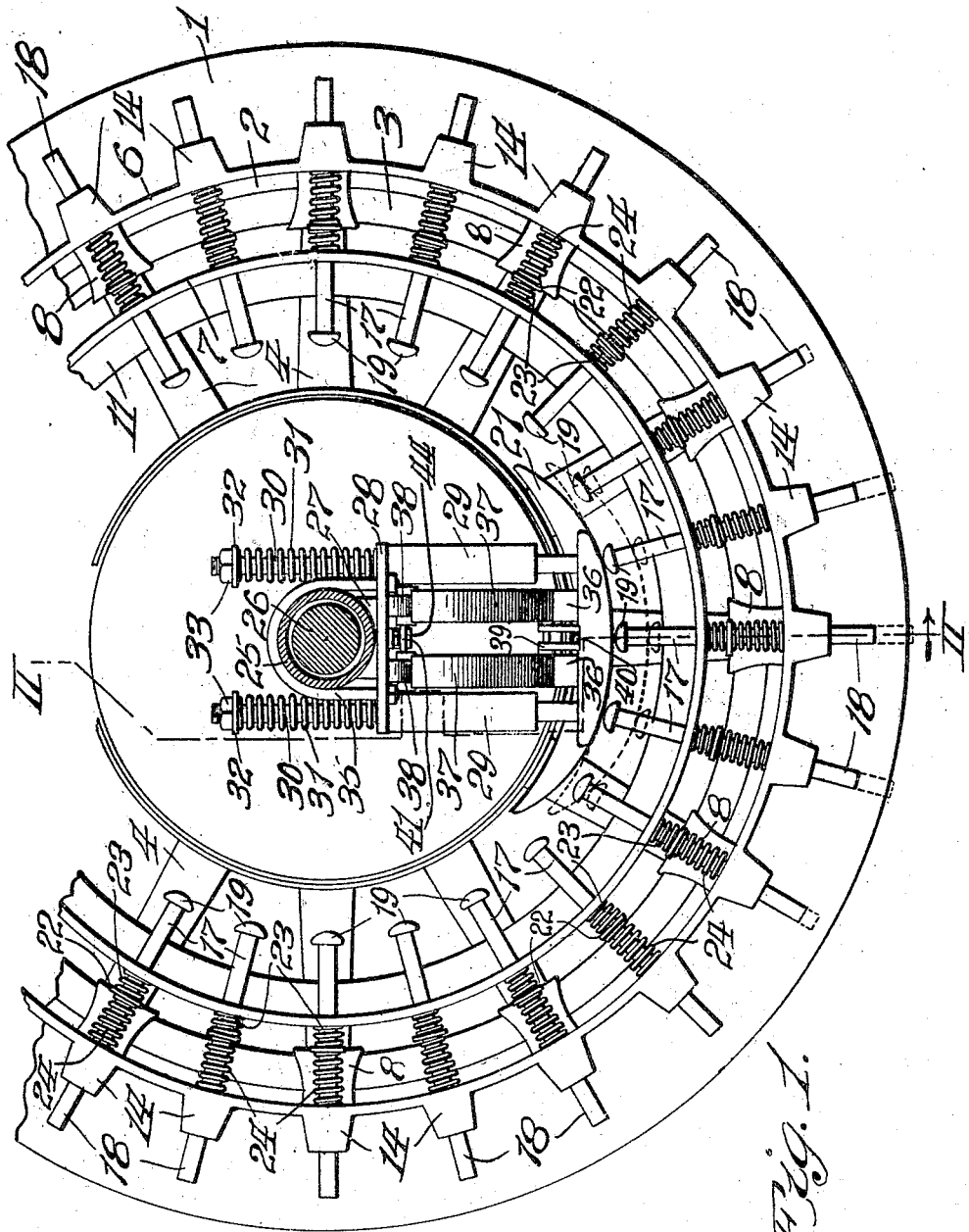

UNITED STATES PATENT OFFICE.

JONAS A. TAUTPHAEUS, OF SAPPINGTON, MISSOURI.

ANTISLIPPING DEVICE FOR POWER-DRIVEN-VEHICLE WHEELS.

1,149,305.  Specification of Letters Patent.  Patented Aug. 10, 1915.

Application filed June 19, 1913.  Serial No. 774,515.

*To all whom it may concern:*

Be it known that I, JONAS A. TAUTPHAEUS, a citizen of the United States of America, residing at Sappington, in the county of St. Louis and State of Missouri, have invented certain new and useful Improvements in Antislipping Devices for Power-Driven-Vehicle Wheels, of which the following is a specification.

This invention relates more especially to automobile wheels, the primary object being to provide a pavement gripping means that is not carried on the tread of the wheel.

A further object is to provide improved pavement gripping means that are carried by the rear wheels adjacent one side of the tread thereof.

Another object is to provide means whereby this improved device is operable on a pavement only when necessary, as in the case of emergency when the wheels are skidding, or in the event of coming in contact with slippery pavements.

Other and further objects will appear in the specification, and be specifically pointed out in the appended claims, reference being had to the accompanying drawings exemplifying the invention, and in which, Figure 1 is a side elevation of the inside of a wheel, showing this improved device applied thereto, the axle being shown in section. Fig. 2 is a vertical section on the line II—II, Fig. 1. Fig. 3 is a horizontal section on the line III—III, Fig. 2. Fig. 4 is a section showing an interchangeable shoe attached to one of the gripping fingers.

In the types of antislipping devices now in use, which are mounted over the tread of a tire, it has been found that they will eventually deteriorate the tire surface. It has also been found that they are a considerable annoyance in mounting and demounting them to and from the tire. Very often when they are once mounted on tires, they are left on for a considerable length of time long after they are necessary. This improved device provides for antislipping means to be carried by the wheel, the gripping elements thereof only coming in contact with the pavement at the will of the operator.

Referring to the drawings: 1 designates the tire of a wheel mounted in the channel 2 of the felly 3. Said wheel has the usual spokes 4 and hub 5. In the embodiment shown this improved device is provided with an outer annulus 6 and inner annulus 7. A series of brackets 8 are secured to the annulus 6 and arranged radially therearound. Said brackets have a flat horizontal portion 9 which is adapted to be seated against the inner surface of the felly 3, and to be secured thereto by the bolts 10. The annulus 7 has secured thereto on one side thereof a right-angle portion 11 which is adapted to fit against one side of the spokes 4, and is secured thereto by bolts 12. It is preferable to secure the annuli 6 and 7 together by a series of ribs 13 so that they will always aline with one another.

Radially arranged around the periphery of the annulus 6 are a series of bearing blocks 14. Each block 14 has formed therein an opening 15. Each of said openings 15 is adapted to be in radial alinement with openings 16 formed in the annulus 7. Reciprocally mounted in each pair of openings 15 and 16 are pavement gripping fingers 17. The outer ends 18, which are adapted to engage the pavement, can be pointed or otherwise in order to give the best gripping results.

Formed on the inner end of each finger 17 is a rounded head 19 which is adapted to engage the concave surface 20 of an engaging shoe 21. Secured to each finger 17, and positioned thereon between the annuli 6 and 7, are washers 22. Mounted on said fingers on each side of said washers 22 are springs 23 and 24.

Mounted on the under side of the housing 25 of the axle 26 are a pair of shoes 27, forming part of a horizontal plate 28. Said plate has formed thereon, and depending therefrom at one end, a pair of vertical bearings 29 in which are mounted a pair of vertical guiding rods 30. Said guide rods extend upwardly above said plate 28 and on each side of the housing 25. Mounted on each guide 30, and resting on top of the plate 28, is a spring 31. Each of said springs, at their upper ends, bear against washers 32 held on the upper ends of said guides 30 by nuts 33. The lower ends of these guide rods 30 are secured to the engaging shoe 21.

Mounted over the housing 25, and secured at their lower ends by nuts 34 to the plate 28, are a pair of U-bolts 35. Secured to the shoe 21, and on the inside of the guides 30, are a pair of upstanding brackets 36, the upper ends thereof being bifurcated for the purpose of holding one end of a pair of leaf springs 37. Each of said leaf springs has secured thereto a roller 38, which rollers are adapted to bear against the under side of the plate 28. Secured to the opposite end of each spring 37 is a cable connection 39 to which is secured a cable 40. It is to be understood that an improved device of this character is to be mounted on the inside of each rear wheel, the parts being identical. There will, therefore, be a pair of cables 40 which will lead on up to the point adjacent the operator, and will be connected to some lever movement not shown.

In the operation of this improved device, when applied to a pair of vehicle wheels, if it is not necessary to apply gripping means to the pavement, the operable parts assume their position as shown in full lines in the drawings. But when it is desired to engage the gripping fingers 17 against the surface of the pavement or roadway, power is applied to the cables 40, and movement is given to the springs 37. Said springs having the requisite stiffness and resiliency, and being pivoted at 41 to the rollers 38, a downward pressure will be applied to the brackets 36, thereby carrying the engaging shoe 21 downwardly. This downward movement will carry the said shoe into engaging alinement with the heads 19 of the fingers 17. Said fingers 17 are carried by the wheel, and as they pass under the concave surface 20 of said shoe, they will be depressed until the outer ends 18 thereof come in contact with the pavement. As the wheel continues to rotate and the points are carried around, the heads 19 will ride from under the concave surface 20 of the shoe 21. The springs 24 of each finger engaging against the annulus 6 and their respective washers 22, will carry said fingers to their normal, or idle, position. So long as the engaging shoe 21 is depressed, said engaging fingers, as their heads 19 engage said shoe, will be pressed downwardly in contact with the pavement. When this gripping function is no longer required, the cable 40 is released and the springs 31, mounted on the guides 30, will elevate the shoe 21 to its normal position. Then the fingers 17 will discontinue engaging the pavement. If obstacles on the roadway are encountered by the ends 18 of the fingers 17, which will not allow said fingers to come in contact with the roadway, the shoe 21 will be forced upwardly against the pressure of the springs 37. The springs 23 mounted on the fingers 17 merely serve as cushion springs after said fingers have been released from the shoe 21.

If a vehicle, equipped with this improved device, is traveling over country roads, shoes 42 having a large contacting surface, such as shown in Fig. 4, can be mounted on the outer ends 18 of the fingers 17, and be held by the set screws 43.

In order to hold the rollers 38 of the springs 37 against the under side of the plate 28, a flat horizontal leaf spring 44 is secured to the under side of said plate 28 for engagement with the pivot 41 of said rollers.

What I claim is:

1. In an antislipping device for a vehicle wheel, a frame carried by said wheel, a series of fingers carried by said frame adapted to reciprocate therein, a shoe for engagement with said fingers, and a pivotally mounted resilient member having a movable pivot adapted to engage said shoe against said fingers.

2. In an antislipping device for a vehicle wheel, a series of reciprocably mounted fingers carried by said wheel, an axle for said wheel, a housing for said axle, a plate secured to said housing, a shoe having a pair of guide rods secured thereto, said guide rods being reciprocably mounted in said plate, a pivotally mounted leaf spring having one end engaged against said guide rods, said leaf spring being pivotally mounted to a roller, said roller bearing against said plate, said leaf spring when actuated on its pivot adapted to engage said shoe against one end of said fingers.

3. In an antislipping device for a vehicle wheel, a frame carried by said wheel, a series of fingers carried by said frame adapted to reciprocate therein, and a shoe for engagement with said fingers and a leaf spring for engaging said shoe against said fingers.

4. In an antislipping device for a vehicle wheel, a frame carried by said wheel, a series of pins reciprocably mounted therein, a movable shoe for engagement with said pins and a pivotally mounted leaf spring for engaging said shoe against said fingers.

5. In an antislipping device for a vehicle wheel, a frame carried by said wheel, a series of pins reciprocably mounted therein, a movable shoe for engagement with said pins a pivotally mounted leaf spring for actuating said shoe, said shoe adapted to move said fingers outwardly.

JONAS A. TAUTPHAEUS.

In the presence of—
WM. TAUTPHAEUS,
M. C. HAMMON.